Sept. 26, 1950            A. O. JÖRGENSEN            2,523,627
MIRROR POSITION INDICATING DEVICE
FOR TELEPHONE SWITCHES
Filed Feb. 28, 1946

Inventor
A. O. Jorgensen

Patented Sept. 26, 1950

2,523,627

UNITED STATES PATENT OFFICE 2,523,627

MIRROR POSITION INDICATING DEVICE FOR TELEPHONE SWITCHES

Anders Ossian Jörgensen, Traneberg, Sweden, assignor to Telefonaktiebolaget L M Ericsson, Stockholm, Sweden, a company of Sweden Application February 28, 1946, Serial No. 650,976
In Sweden March 2, 1945

1 Claim. (Cl. 179—27.52)

The present invention relates to a device, especially for telephone plants, for indicating the position of the wiper arms of the selector. The object of the invention is to produce a device for indicating a position, said device having a simple construction and allowing clear reading. This is obtained according to the invention chiefly in a wiper arm and a guiding device for said arm being provided with a mirror and a scale respectively, which are arranged so, that the position of the wiper arm can easily be read in the mirror.

Figure 1:
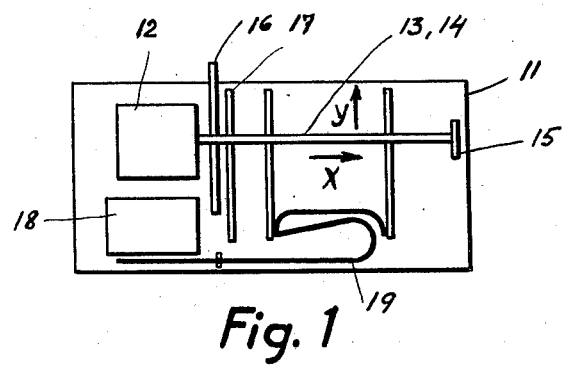
Figure 2:
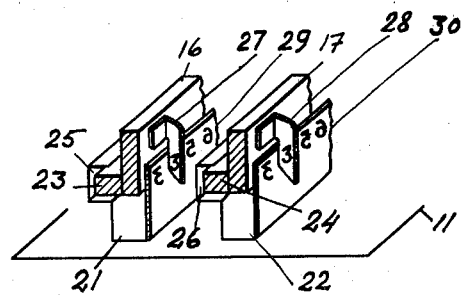

The invention will be described more clearly with reference to the accompanying drawing. Fig. 1 schematically shows a part of a selector with two directions of rotation X and Y, perpendicular to each other. Fig. 2 shows the device for indicating the position in a selector according to Fig. 1.

The selector according to Fig. 1 is mounted on a bottom plate 11. To the left on the bottom plate, there is the driving means 12 of the selector, which in a way known per se is arranged to be able to revolve two horizontal shafts 13, 14, of which one is hiding the other in Fig. 1. The ends of the shafts are cradled in a bearing bracket 15. The wiper arms of the selector are connected to a flexible conductor 19. They are at first moved in the X-direction, on the shaft 13, revolving, and then, on the shaft 14 revolving, in the Y-direction into the contact field of the selector, which contact field is not shown. Upon movement in the X-direction, a special wiper arm 16 is moved perpendicularly to said direction into the contact field, and upon movement in the Y-direction another wiper arm 17 is moved into the contact field in parallel with said Y-direction. Said wiper arms are driven in a way known per se over gear transmissions of the shafts 13, 14. On the bottom plate 11 there are furthermore spring sets 18, which are arranged in a not shown way to be actuated by the wiper arms 16, 17 on said arms being in their end positions.

Fig. 2 shows a perspective view of a detail of the ends of the wiper arms 16, 17, seen from the part of the bottom plate 19, on which the conductor 19 is set. The wiper arms glide along guide rails 21, 22, respectively, provided with shoulders 23, 24, which run in grooves 25, 26. On the wiper arms 16, 17, there are small mirrors 27, 28, for instance of rust resisting steel, which, on movement of the arms, run along scales 29, 30, respectively, fastened on the guide rails 21, 22. The figures on the scale, printed in reflected style, express the position of the wiper arms in the contact field.

The level of the mirrors is chosen so that, on being close to the bottom plate, in the prolongation of the direction of rotation of the wiper arms, it is easy to read the scale-value, in front of which the respective mirror lies, whereby the X-value has to be read on the left, and the Y-value on the right.

The invention is naturally not limited to the embodiment shown in the figure. Many modifications are conceivable. Thus, for instance, the scales may be fastened on the wiper arms and the mirrors on the guide rails, the advantage being, that the positions of the wiper arms could always be read at two places, fixed in relation to the bottom plate and the frame.

I claim:

In a telephone selector, a plurality of sets of wiper arm assemblies each comprising a wiper arm element movable in a rectilinear path and a guide element for said wiper arm element, the wiper arm elements of all of said sets being arranged in side-by-side relationship for movement in paths parallel to one another, a scale comprising a plurality of marks carried by one element of each set, and a mirror fixedly secured to the other element of such set and at such an angle as to reflect, in a direction parallel to the directions of movement of said wiper arm elements, an image of a limited portion of the corresponding scale, whereby the relative positions of all of said wiper arm elements with respect to their corresponding guide elements will be represented by reflected scale readings visible in side-by-side relation from a direction endwise of said assemblies.

ANDERS OSSIAN JÖRGENSEN.

REFERENCES CITED

The following references are of record in the file of this patent:

UNITED STATES PATENTS

| Number | Name | Date |
|---|---|---|
| 1,508,465 | McGhan | Sept. 16, 1924 |
| 2,052,059 | Sengebusch | Aug. 25, 1936 |